July 5, 1960  R. B. MASON  2,944,031
SELECTIVE ADSORBENT CHAR FOR SEPARATION OF STRAIGHT
CHAIN FROM NON-STRAIGHT CHAIN HYDROCARBONS
Filed Sept. 5, 1957
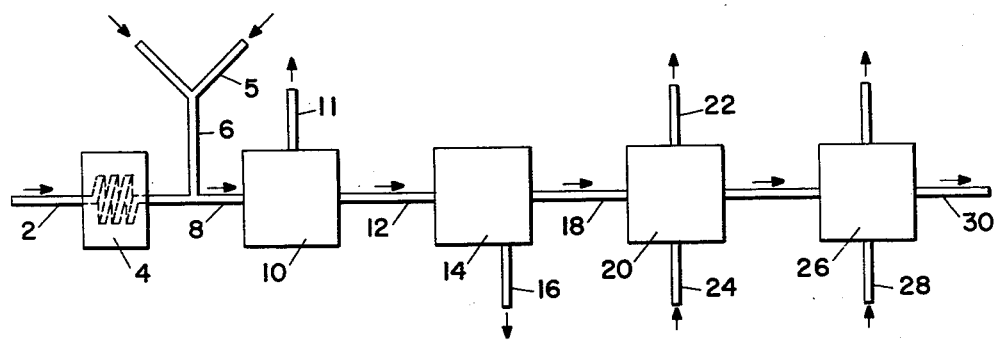
FIGURE 1
FIGURE 2
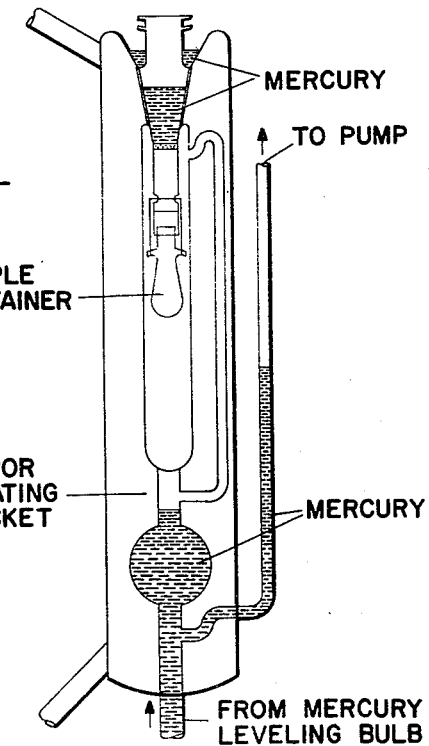
RALPH B. MASON  INVENTOR
BY Richard W. Nagel  ATTORNEY

2,944,031

SELECTIVE ADSORBENT CHAR FOR SEPARATION OF STRAIGHT CHAIN FROM NON-STRAIGHT CHAIN HYDROCARBONS

Ralph Burgess Mason, Denham Springs, La., assignor to Esso Research and Engineering Company, a corporation of Delaware Filed Sept. 5, 1957, Ser. No. 682,218

6 Claims. (Cl. 252—421)

The present invention relates to an improved selective adsorbent for the separation of hydrocarbons, and particularly straight chain hydrocarbons from branch chain and cyclic hydrocarbons. More particularly, it relates to an adsorbent, and a method for preparing an adsorbent, which has the property of separating narrowly boiling hydrocarbons into straight chain compounds and other types, such as branch chain and cyclic compounds by selectively adsorbing the normal paraffin and olefins.

It is well known in the art that an activated carbon useful in hydrocarbons separations may be made by steaming carbon from various sources, such as wood charcoal, coconut shells, petroleum chars and the like. Activated carbons made in this manner have some selectivity for separation of straight chain hydrocarbons. Activated carbons made in this manner have some selectivity for the separation of straight chain hydrocarbons from branch chain isomers, but the selectivity is too low for commercial application of such separation processes. It is highly desirable to make these separations, in particular, to remove straight chain, low octane hydrocarbons from naphtha streams boiling in the gasoline boiling range. Removal of these components from, say, virgin or catalytic naphtha results in the substantial upgrading of these fractions.

According to the present invention, it has been found that certain synhetic resins, and particularly polymers of vinylidene chloride, when charred and activated by the process of the present invention, produce active chars possessing these selective adsorption characteristics to a marked degree. These same resins, however, when charred in a manner not within the scope of the present invention, do not produce chars with these selective adsorption characteristics.

When it was attempted to prepare chars from polyvinylidene chloride by heating the material, considerable difficulties were encountered. Difficulties encountered in the charring of polyvinylidene chloride can be appreciated upon consideration of such polymers. They are thermoplastic, i.e. soften, and can be molded upon the application of heat. Upon the elevation of the temperature to a value in the range of 300° to 400° F., hydrogen chloride is evolved. This gas evolution, together with the plastic characteristic mentioned, produces a plastic, putty-like mass with an enormous volume expansion. This enlargement has been observed to be greater han twenty-fold which for moderate size retorting sections, forces some of the expanded product to cool sections of the system. Solidification results upon cooling which causes stoppages in the exit lines. Thus, due to these characteristics a hazardous condition is encountered due to stoppages of the exit lines and the safety vent lines. Also, a sizeable portion of the product is removed from the heating section because of the volume expansion and the clinker-like nature of the char.

In operations producing appreciable quantities of the char this solidification in both the heated and unheated sections of the system also is a severe handicap to efficient heat input and renders the rapid and economical withdrawal of the product an impossibility. Thus the difficulties in charring in a conventional system are threefold, i.e. (1) hazardous, (2) results in impure product due to solidification in hot and cold sections of the system, and (3) uneconomical due to problems associated with handling the product and to methods of heating. Furthermore, the final product, though having excellent adsorptive characteristics, showed no particular selectivity for normal hydrocarbons over non-normals.

In brief compass, in accordance with the present invention, a polyvinylidene chloride, such as "Saran" supplied by the Dow Chemical Company, is heated in suspension in a suitable liquid to a temperature of about 400° to 700° F., the liquid having a similar boiling range. This permits dehydrochlorination over conditions where volume expansion is near maximum. Following the partial dehydrochlorination and setting of the plastic, the solvent is removed by settling, and/or filtration, and, if desired, subjected to further pyrolysis in the presence of an inert stripping gas to sweep out liberated HCl.

The process of the present invention will be better understood when read in conjunction with the accompanying drawing, which is a flow plan of a preferred embodiment thereof.

Turning now to the drawing, solvent for the process is passed through line 2 to preheater 4 and heated to a temperature of about 400° to 700° F. A suitable solvent is a light, highly refined mineral oil having a kinematic viscosity of about 0.2 to 2 centistokes at the operating temperature; other solvents that may be employed are aromatics, silicone polymers, molten metals, molten salts, and the like. The resin is added via hopper 5 and the mixture passed into heating-soaking vessel 10. Temperatures here are maintained in the range of 400° to 700° F., preferably 450° to 600° F.; suitable heating means such as fired coils, steam lines and the like may be employed. A residence time of 30 to 60 minutes is desirable. Liberated HCl is removed through line 11.

Due to the liquid heating medium, excellent temperature control may be maintained during the critical period when the resin is initially charred and normally goes through a semi-plastic, tacky stage, at which stage it is extremely difficult to manage. As discussed previously, this sticky, semi-plastic state is due to the thermoplastic nature of the resin and the difficulties are increased by the expansion due to hydrogen chloride evolution. It has been observed that these difficulties are further removed by addition of the resin to the liquid in small increments or continuously so that the initial volume expansion is effected immediately and because of the size of the charge does not reach unmanageable dimensions. The partially decomposed and expanded product, especially when the decomposition is accompanied with agitation, is finely divided segregated particles amenable to filtration and subsequent extraction or stripping of the solvent.

The semi-charred resin is now passed via line 12 to separator 14 where, by settling and/or filtration, the solvent is withdrawn through line 16 and may be recycled. The product char is passed through line 18 to vessel 20 where residual solvent is removed by stripping with steam admitted through line 24. Alternatively, an auxiliary solvent such as benzene, naphtha hydrocarbons, chloroform, acetone or the like may be used to remove adhering solvent.

Final pyrolysis is carried out in vessel 26. Here the char is heated to 1000° to 2000° F., preferably 1400° to 1800° F. Heat for this is supplied by any convenient means. A suitable method consists in direct firing with vessel 26 as relatively small diameter tubes (6 inch diameter and less). Other methods consist in indirect heating with the reactor tubes passing through a heated fluidized bed such as sand, spent cracking catalyst and the like. Still other methods consist in heat transfer from an inert solid such as sand, metallic salt and the like, followed by separation of the char from the solid by elutriation, solvent extraction or by some suitable means. The final pyrolysis step is also preferably carried out in the presence of an inert gas, such as nitrogen, introduced through line 28 to sweep out further liberated HCl. The finished char is withdrawn through line 30 and is now ready, without steam activation to carry out the selective adsorption described previously.

The process of the present invention may be modified in many details. The process is not limited to operation with polyvinylidene chloride polymers although a whole number mole ratio of carbon to volatile gaseous compound is quite desirous. Thus, for example, polyvinylidene chloride can be considered a carbon hydrochloride, i.e. $[C_2(HCl)_2]_n$. This feature exists in other compounds such as hexachlorocyclohexane, paraffin hydrocarbons chlorinated to the extent of $C_nH_{n+1}Cl_{n+1}$ and the like. Such materials are satisfactory as feeds to pyrolysis or may be mixed with a vinylidene chloride polymer. Of these materials trichloroethane offers the greatest possibility. It is the most economical being prepared by the chlorination of ethylene. This feature of pyrolyzing a carbon containing compound having a stable material evolved as a gas is not peculiar to the chloro hydrocarbons. It is to be found in the carbohydrate molecules including starch and cellulose structures. With such materials water is evolved upon pyrolysis leaving carbon. Although charring of such materials is described in prior art, the altered performance obtained upon pyrolyzing in the presence of a liquid suspendant permits the use of such materials in place of or mixed with the chloro compounds mentioned as a feed to charring operation.

The process of the present invention may be further illustrated by the following specific examples:

EXAMPLE 1

Polyvinylidene chloride was charred with difficulty in separate experiments using a "Vycor" reactor at temperatures of 1000°, 1200° and 1400° F. with the periods on temperature being in the range of one to two hours. The charges of 20–21 grams were heated with nitrogen flow to initial decomposition temperature of about 350° to 400° F. where the volume expansion necessitated stoppage of the gas flow and in some instances removal of part of the charge. Only the material remaining in the heated zone was employed in subsequent tests. Due to stoppages in the exit lines the continuation of the charring was in the absence of purge gas and the evolved gas was backed out through the inlet or through a connection improvised at the entrance of the thermocouple well.

EXAMPLE 2

The difficulties encountered in the previous experiments were overcome by conducting the initial decomposition in presence of a liquid suspendant, which in the present operation was Nujol. To 767 grams of hot Nujol (500° F.) 47 grams of polyvinylidene chloride were added with stirring in small increments over a 30 minute period. A two liter flask equipped with a reflux condenser and stirrer served as the reactor. Although the decomposition was essentially complete upon completion of the addition the product was kept on heat for four hours. The partially decomposed product was filtered and was then extracted with benzene in Soxhlet equipment to remove the residual Nujol. The remaining product was heated in a slow stream of nitrogen (10 cc./min.) from ambient temperature to 1450° F. and for two hours at 1450° F. As a result of the initial treatment no difficulty was experienced in this final heat treatment. This is in marked contrast to the charring operation in the same equipment without the initial decomposition in the presence of a suspendant.

In other experiments the product from this and a similar decomposition in Nujol but at 400° F. were given final decomposition treatments of 600° F. and 1650° F. in addition to the 1450° F. treatment described above.

EXAMPLE 3

Chars obtained by the process of Example 1 and Example 2 were examined for adsorption characteristics. Their adsorptive properties towards pure n-heptane and 2-methylpentane were determined by measurements in a laboratory apparatus designed for adsorption studies. A sketch of the equipment is shown in Figure 2. The char sample is weighed (about 0.5 gram) into its container, inserted into the apparatus as shown and the system is evacuated. Mercury is then allowed into the reservoir at the bottom, allowed to reach temperature and the height differential between the mercury level above the reservoir and the level in the tube to the vacuum pump noted. A small measured amount of adsorbate (n-heptane, etc.) is pipetted into the sample system by touching the tip of the pipette to the mercury sealed glass frit above the sample, the vacuum system drawing the adsorbate through the frit. After the system equilibrates the pressure is read once again. This procedure is repeated until about 500 mm. Hg pressure exists in the sample system. From the known volume of the sample container above the mercury reservoir, the size of the adsorbent sample taken and the pressure-adsorbate relationships the adsorption capacity is determined directly.

By such measurements it has been observed that the chars prepared by initial decomposition in a liquid suspendant is selective for normal paraffin hydrocarbons and rejects to a major extent branched chain paraffins. Data showing this are:

*Adsorption of polyvinylidene chloride chars*

| Pretreatment | Pyrolysis Temp., °F. | Adsorption, cc./g. | | |
|---|---|---|---|---|
| | | n-Heptane | 2-Me Pentane | Toluene |
| None | 1,000 | 0.34 | 0.34 | 0.34 |
| None | 1,200 | 0.34 | 0.33 | 0.37 |
| None | 1,400 | 0.39 | 0.43 | 0.40 |
| Nujol @ 400° F | 600 | 0.13 | | |
| Nujol @ 400° F | 1,450 | 0.41 | 0.31 | |
| Nujol @ 500° F | 1,450 | 0.26 | 0.07 | 0.23 |
| Nujol @ 500° F | 1,650 | 0.20 | 0.02 | 0.24 |

What is claimed is:

1. An improved process for preparing a selective adsorbent char having uniform pores adapted to adsorb straight chain hydrocarbons and reject non-straight chain hydrocarbons, which comprises heating a chlorinated hydrocarbonaceous composition wherein the ratio of hydrogen to chlorine atoms is 1:1 and which evolves on pyrolysis a hydrogen chloride comprising gas to a temperature in the range of about 400° to 700° F. while suspended in a liquid having a boiling point within the range of approximately 400° to 700° F., partially charring said hydrocarbonaceous material in said liquid, maintaining a residence time of from 30 to 60 minutes, removing said charred material from said liquid, thereafter heating said charred material to a temperature of from about 1000° to 2000° F. and recovering a superior selective adsorbent char.

2. An improved process for preparing a selective adsorbent char which comprises heating a suspension of polyvinylidene chloride in an organic liquid having a boiling point within the range of about 400° to 700° F. at a temperature of 400° to 700° F., maintaining a residence time of from 30 to 60 minutes in said liquid, separating said liquid from char, and further heating said char at a temperature of 1000° to 2000° F. in the presence of an inert gas.

3. The process of claim 2 wherein said liquid is a light, highly refined mineral oil having a kinematic viscosity of 0.2 to 2 centistokes.

4. The process of claim 2 wherein said initial charring temperature is in the range of 450° to 600° F. and the final pyrolysis temperature is about 1400° to 1800° F.

5. The process of claim 2 wherein said polymer is continuously added in small increments to said liquid.

6. A selective adsorbent char having the property of adsorbing straight chain hydrocarbons and rejecting branched chain hydrocarbons prepared by suspending polyvinylidene chloride in a highly refined mineral oil having a kinematic viscosity of from about 0.2 to 2 centistokes, heating said suspension for 30 to 60 minutes at 450° to 600° F., removing charred material from said liquid and further heating said charred material in the presence of an inert gas at a temperature of 1400° to 1800° F.

References Cited in the file of this patent

UNITED STATES PATENTS

| | | |
|---|---|---|
| 1,442,372 | Wallerstein | Jan. 16, 1923 |
| 1,499,908 | Chaney | July 1, 1924 |
| 1,563,295 | Sauer | Nov. 24, 1925 |
| 2,609,256 | Baker et al. | Sept. 2, 1952 |
| 2,736,642 | Baker et al. | Feb. 28, 1956 |

FOREIGN PATENTS

| | | |
|---|---|---|
| 262,278 | Great Britain | Dec. 9, 1926 |
| 412,209 | Great Britain | June 18, 1934 |
| 802,765 | France | June 13, 1936 |